P. HARDER.
PUNCTURE HEALING TUBE.
APPLICATION FILED MAR. 22, 1922.

1,429,031. Patented Sept. 12, 1922.

INVENTOR.
P. Harder.
BY Marks & Clerk
ATTORNEYS.

Patented Sept. 12, 1922.

1,429,031

UNITED STATES PATENT OFFICE.

PAULLI HARDER, OF COPENHAGEN, DENMARK.

PUNCTURE-HEALING TUBE.

Application filed March 22, 1922. Serial No. 545,846.

*To all whom it may concern:*

Be it known that I, PAULLI HARDER, manufacturer, subject of the Kingdom of Denmark, residing at Copenhagen, Denmark, have invented certain new and useful Improvements in Puncture-Healing Tubes, of which the following is a specification.

This invention relates to improvements in pneumatic tires and has for its object to provide an inner tube which is so constructed as to afford a high degree of protection against "blow outs" and punctures.

A further object of the invention consists in the provision of an inner tube for pneumatic tires wherein an inner tubular member formed of rubber is coated with a layer of suitably plastic puncture healing material, said puncture healing material being enveloped by a spirally wrapped strip of fabric which is designed to limit the elasticity or extension of the tube and prevent blow outs, the fabric being enclosed in an outer layer of rubber.

Figure 1:
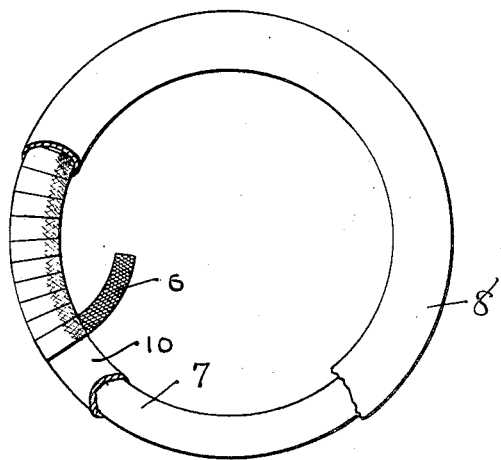
Figure 2:
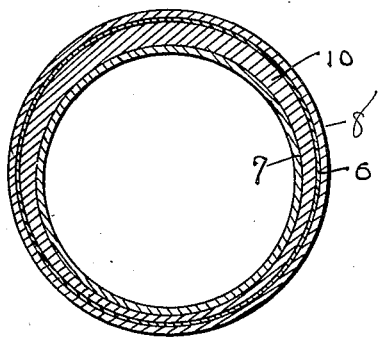

With these and other objects in view, the invention consists in the novel construction and arrangement of parts as will be hereinafter more fully described and claimed, reference being had to the accompanying drawing in which:

Figure 1 is a side elevation of a tube constructed in accordance with the invention, portions thereof being broken away to show the arrangement of the various parts; and, Fig. 2 is a transverse sectional view through the tube;

Referring to the drawing in detail, the numeral 7 indicates an inner tubular element of annular form which is enveloped by a suitably thick layer of puncture healing material 10 and which is adapted, when the tube is penetrated by a sharp object, to fill in the hole and prevent the escape of air from the interior of the tube.

A strip 6 having diagonally extending threads is spirally wrapped in one or more layers about the puncture healing material 10 and is preferably so arranged that the convolutions partially overlap each other.

The layer of fabric constituted by the spirally wrapped strip 6 is enveloped in an annular tubular outer member 8, which is adapted to be presented to the interior of the tire casing or shoe in connection with which the tube is used.

The spirally wrapped fabric strip 6 constitutes a substantially non-extensible closed container for the plastic puncture healing material 10 and also limits the extensibility of the tube preventing the latter from blowing out at points adjacent weak or broken places in the outer tire casing. By wrapping the fabric strips spirally about the layer of puncture healing material 10, the latter is completely enveloped by the fabric material while the entire area of the tube itself is adequately reinforced against blow outs. The layer of puncture healing material 10 acts to seal punctures in the tube produced by the penetration of sharp objects and it is permanently confined between the inner tubular member 7 and the layer of fabric 6.

What I claim is:—

An inner tube for pneumatic tires comprising an unbroken annular inner elastic tubular member, a layer of plastic puncture healing material completely enveloping the entire outer area of said inner tubular member, and a spirally wrapped strip of fabric arranged about the healing material and forming a fabric layer completely enveloping the puncture healing material and constituting a substantially non-extensible closed container therefor, and an outer elastic tubular member enveloping the fabric layer and in direct contact with the entire outer area thereof.

In testimony whereof I affix my signature.

PAULLI HARDER.